(12) United States Patent
Young

(10) Patent No.: US 6,206,395 B1
(45) Date of Patent: Mar. 27, 2001

(54) TELESCOPIC AND VARIABLE TILT BICYCLE GOOSENECK

(76) Inventor: Arthur D. Young, 701 Vallejo Way, Montclair, CA (US) 91763

( * ) Notice: Subject to any disclaimer, the term of this patent is extended or adjusted under 35 U.S.C. 154(b) by 0 days.

(21) Appl. No.: 09/350,059

(22) Filed: Jul. 8, 1999

(51) Int. Cl.[7] .................................................. B62K 21/14
(52) U.S. Cl. ..................... 280/278; 74/551.3; 74/551.8
(58) Field of Search ............................. 280/280, 47.315, 280/278; 74/551.1, 551.3, 551.4, 551.5, 551.6, 551.7, 551.8; 403/196, 199, 321, 322.4

(56) References Cited

U.S. PATENT DOCUMENTS

| | | | |
|---|---|---|---|
| 4,263,818 | * | 4/1981 | Ozaki ...................................... 74/475 |
| 4,305,578 | * | 12/1981 | Disbrow et al. ........................ 272/73 |
| 4,384,497 | * | 5/1983 | Gatsos .................................. 74/551.4 |
| 4,577,860 | * | 3/1986 | Matias .................................... 272/73 |
| 4,939,950 | * | 7/1990 | Girvin ................................... 74/551.2 |
| 5,133,224 | * | 7/1992 | Prins ..................................... 74/551.3 |
| 5,138,900 | * | 8/1992 | Hals ..................................... 74/551.7 |
| 5,241,881 | * | 9/1993 | Chen .................................... 74/551.2 |
| 5,273,302 | * | 12/1993 | Ureel ....................................... 280/279 |
| 5,323,664 | * | 6/1994 | Fairfield et al. ...................... 74/551.3 |
| 5,327,798 | * | 7/1994 | Lerch, Jr. ............................. 74/551.3 |
| 5,357,826 | * | 10/1994 | Morrone ............................... 74/551.3 |
| 5,456,135 | * | 10/1995 | Li ......................................... 74/551.7 |
| 5,509,328 | * | 4/1996 | Lai ........................................ 74/551.3 |
| 5,727,427 | * | 3/1998 | Nien ..................................... 74/551.3 |
| 5,737,967 | * | 4/1998 | Hartley ................................. 74/551.3 |
| 5,887,490 | * | 3/1999 | Dittmar ................................ 74/551.3 |

* cited by examiner

Primary Examiner—Brian L. Johnson
Assistant Examiner—Daniel Yeagley
(74) Attorney, Agent, or Firm—Rob L. Phillips

(57) ABSTRACT

A Telescopic and Variable Tilt Bicycle Gooseneck handlebar system designed for bicycles of all types. A pivot base, pivot arm, hollow stem and truss axle allow for easy adjustment of bicycle handlebars. The design implemented herein allows for the bicycle handlebars to be raised and lowered as well as tilted towards or away from a rider of the bicycle. Raising the handlebars is accomplished by raising and lowering the hollow stem through an opening in the pivot arm. The handlebars are tilted by disengaging the truss axle thereby allowing the pivot arm to rotate laterally with respect to the mounted pivot base.

4 Claims, 3 Drawing Sheets

TELESCOPIC AND VARIABLE TILT BICYCLE GOOSENECK

FIELD OF THE INVENTION

The present invention relates to an adjustable bicycle handlebar stem, commonly known as a "gooseneck", for bicycles of all types including, but not limited to, standard, racing and mountain bikes. The gooseneck disclosed herein is capable of being adjusted to raise and lower the handlebars and is further capable of being adjusted to tilt the handlebars toward or away from the rider of the bicycle.

BACKGROUND OF THE INVENTION

Bicycles have been utilized as a means of transportation for over a hundred years and continue to grow in popularity. The mountain bike is one type of bike that has become more and more popular in recent years. Bike riders desire bikes that can be used to traverse residential streets while also being capable of exploring off road areas. Racing bikes are similarly growing in popularity as they can be used for speed as well as leisure touring.

Several problem areas are quickly recognizable with the old-fashioned stationary handlebar and stem bicycle configuration. The problems range from health concerns to children outgrowing their bikes to lack of riding options.

As people ride their bikes more and more they soon realize that there are health problems associated with constant bike riding. Common ailments associated with bike riding are lower back pain, shoulder pain, elbow pain and wrist pain. The aforementioned ailments are a function of the crouched body position necessary during bike riding.

Parents not only observe the health ailments they also notice the financial expenses related to bicycle purchases for their children. Parents must buy larger bicycles as their children continue to grow to adulthood. Additionally, many children will have one bike for touring and one bike for off road activities requiring their parents to purchase two or more bikes on a regular basis. Purchasing bikes in such numbers can become very expensive with the sophisticated bikes on the market.

The problems described and others can be easily and inexpensively solved by utilizing the present invention. The present invention can be adjusted to allow the rider to assume a comfortable position thereby alleviating the health concerns and can further be adjusted to accommodate a growing child.

Many issued patents claim bicycle handlebars or stems that can be adjusted in one manner or another. U.S. Pat. Nos. 5,133,224, 5,273,302, 5,456,135, 5,727,427 and 5,737,967 describe various systems for adjusting bicycle handlebars or bicycle stems. However, unlike the issued patents, the present invention describes an apparatus that allows a much larger range of positions for the bicycle handlebars throughout two different planes of motion. The handlebars can be raised and lowered and also be tilted resulting in numerous possible positions for the bicycle handlebars. Additionally, the present invention is easy to use and requires no tools to accomplish its objective.

SUMMARY OF THE INVENTION

The present invention addresses and solves the aforementioned problems, by allowing the bicycle user to lower and raise the bicycle gooseneck thereby raising and lowering the bicycle handlebars and further allows the bicycle user to tilt the gooseneck thereby tilting the bicycle handlebars toward and away from the user's riding position. The present invention accomplishes its two functions through two independent mechanical objectives, (1) Raising and lowering of the gooseneck and; (2) Tilting of the gooseneck.

Accordingly, the bicycle gooseneck assembly of the present invention comprises a hollow stem having a first end and a second end, the first end suitable to receive a circular member of lessor diameter than the hollow stem, said circular member being a handlebar post. A pivot aim including a circular opening through which the hollow stem is inserted, a means for securing and adjusting the hollow stem within the circular opening, a means for pivoting the pivot arm with respect to a pivot base. A means for mounting the pivot base on a bicycle frame.

DETAILED DESCRIPTION OF THE PREFERRED EMBODIMENTS

Figure 1:
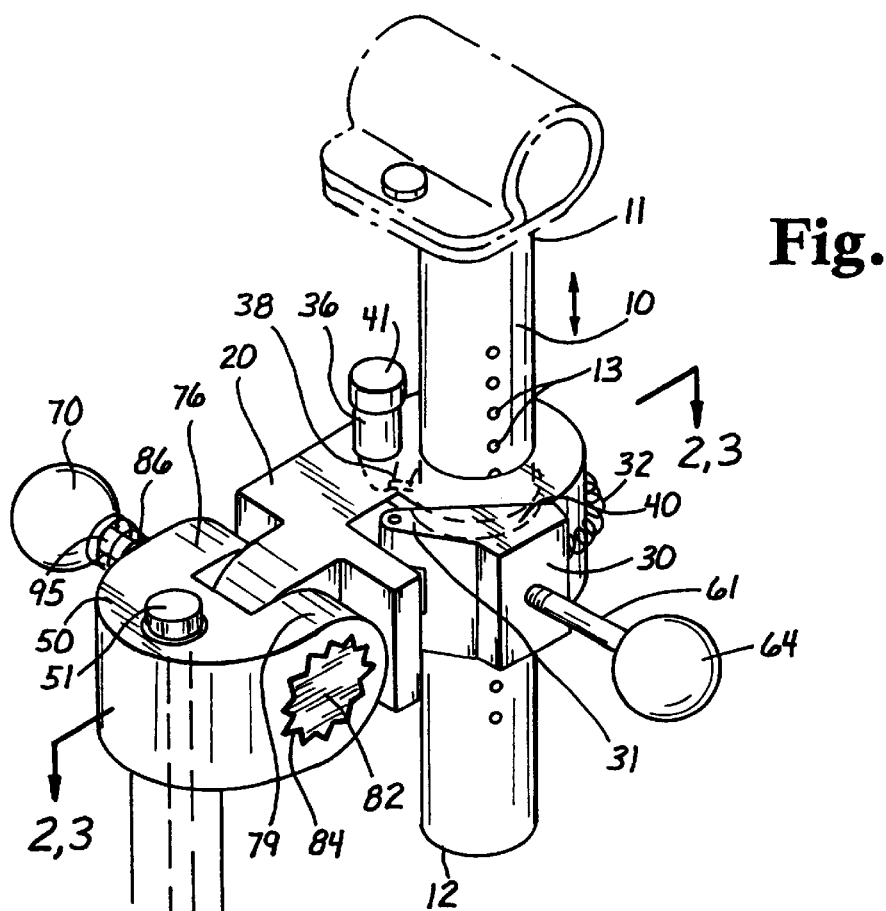
FIG. 1. is a perspective view of the preferred embodiment of the present invention.
Figure 2:
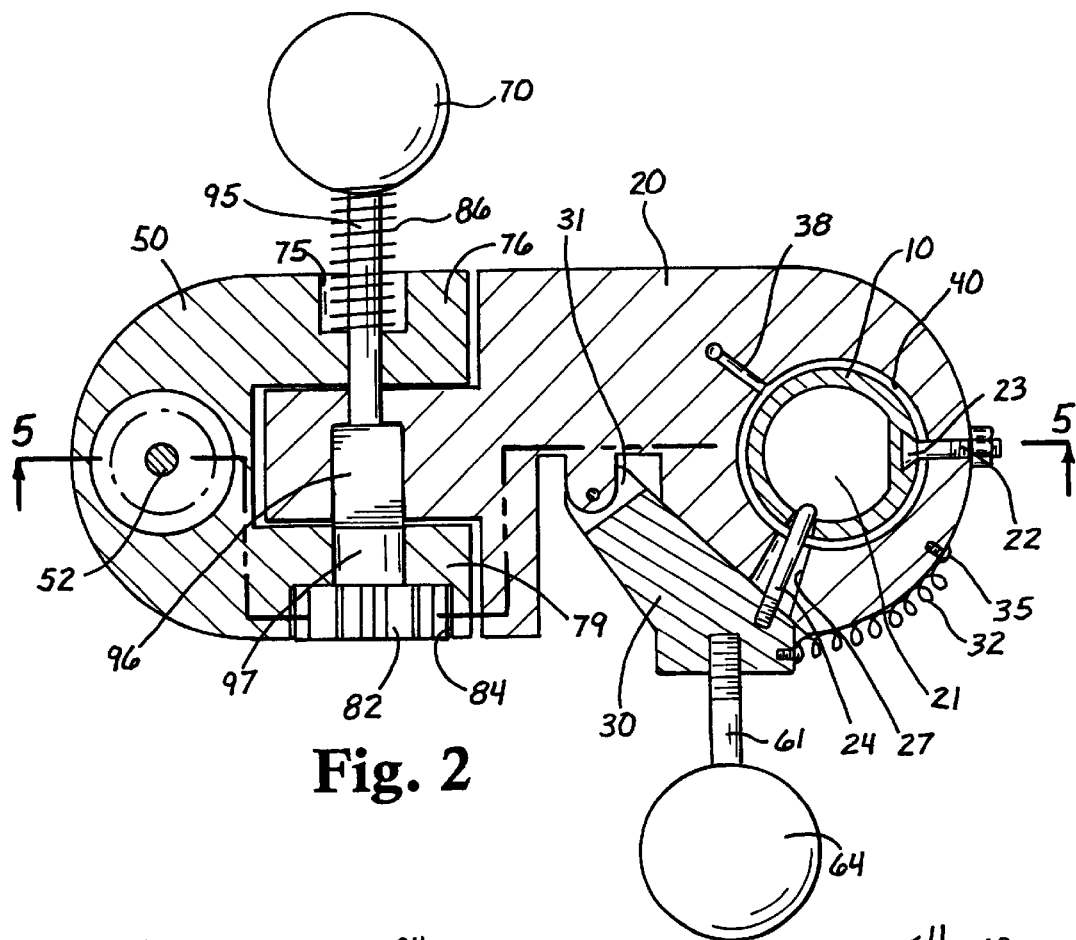
FIG. 2. is a cross-sectional top view of the preferred embodiment of the present invention.
Figure 3:
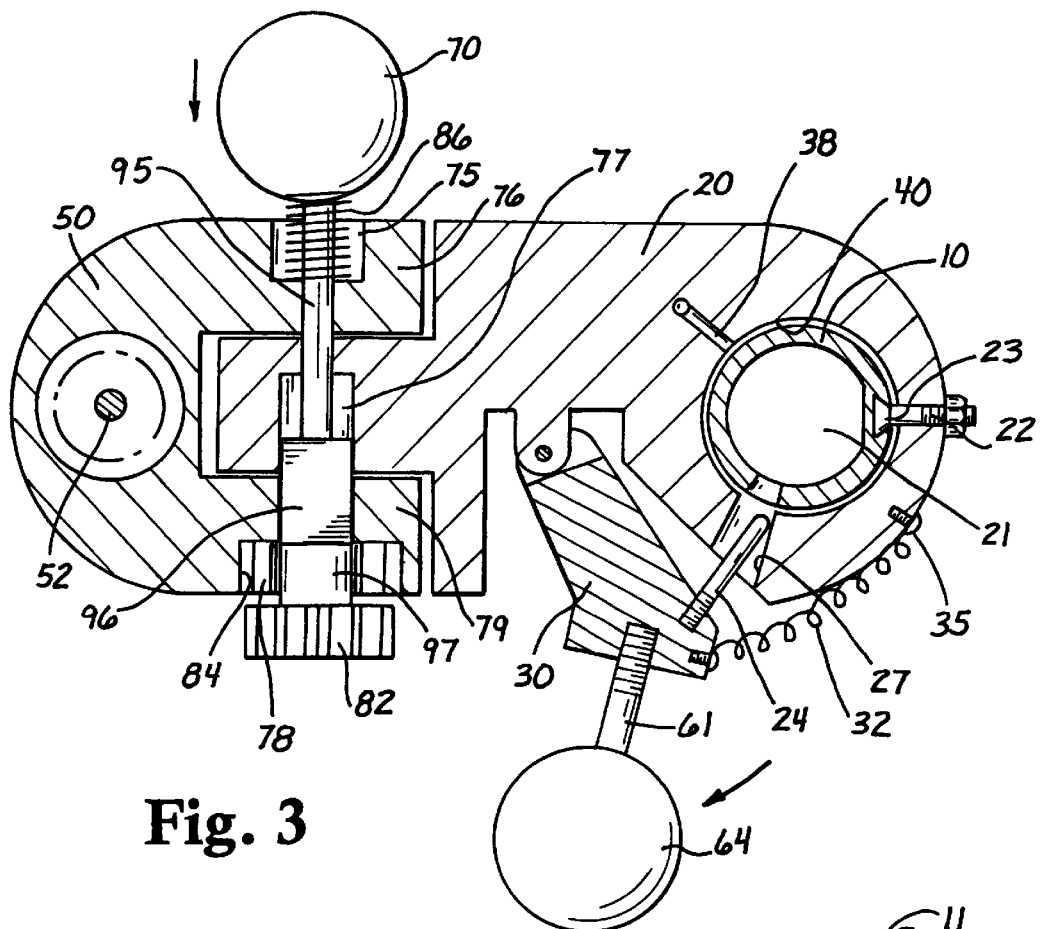
FIG. 3. is a cross-sectional top view of the preferred embodiment illustrating the present invention in an adjusted state.

Referring now to FIGS. 1, 2 & 3, the preferred embodiment of an adjustable bicycle gooseneck assembly according to the present invention is shown to comprise a hollow stem 10, a pivot arm 20 and a pivot base 50.

The hollow stem 10 includes a first end 11 and a second end 12, said first end 11 suitable to receive a circular member of lessor diameter than the hollow stem 10, the hollow stem 10 includes a series of apertures 13 equidistance apart along its length, the hollow stem 10 further includes a notch 15 along its length capable of receiving a caddy 23.

The pivot arm 20 includes a pivot arm opening 21 through which the hollow stem 10 is inserted. The pivot arm 20 further includes means to secure the position of the hollow stem 10 with respect to the pivot arm 20, the securing means may comprise any suitable means, but in the preferred embodiment this securing means comprises a caddy bolt 22 screwed through an outer edge of the pivot arm 20 at a position radially adjacent to the pivot arm opening 21 such that the caddy bolt 22 extends into the pivot arm opening 21 where a caddy 23 is attached to the caddy bolt 22, said caddy 23 fits into the notch 15 in the hollow stem 10 such that the hollow stem 10 is capable of moving lengthwise along the notch 15 but is unable to rotate.

The pivot arm 20 further includes a means to adjust the vertical position of the hollow stem 10 with respect to the pivot aim 20, the adjusting means may comprise any suitable means, but in the preferred embodiment this adjusting means comprises a position pin 24 inserted through a bored hole 27 through an outer edge of the pivot arm 20 at a position radially adjacent to the pivot arm opening 21 such that a first end of the position pin 24 extends into the pivot arm opening 21 and further extends into the apertures 13 in the hollow stem 10 thereby securing the hollow stem 10 in position, a second end of the position pin 24 is attached to a lever arm 30 positioned at an outside edge of the pivot arm 20, a first end of the lever arm 30 being rotatably connected to a mounting pin 31 extending from within the pivot arm 20, a second end of the lever arm 30 being held in place by a coil spring 32, a first end of the coil spring 32 is attached to the second end of the lever arm 30 and a second end of the coil spring 32 is attached to a bolt 35 screwed into the pivot arm 20 as a position radially adjacent the pivot arm opening 21. Adjusting the position of the hollow stem 10 with respect to the pivot arm 20 is accomplished by a rod 61 with a first end of the rod 61 connected to the lever arm 30 at a point near the second end of the lever arm 30, a second end of the rod 61 connected to a first knob handle 64 that when pulled upon laterally rotates the lever arm 30 thereby extracting the pivot rod 24 from the aperture 13 in the hollow stem 10 allowing the hollow stem 10 to move along its length for adjustment. Once the hollow stem 10 is in position, the first knob handle 64 is released causing the coil spring 32 to force the lever arm 30 back to its original position thereby causing the position pin 24 to enter the selected aperture in the hollow stem 10.

A reservoir 36 to hold lubricant is positioned on an upper plane of the pivot arm 20 radially adjacent the pivot arm opening 21, the reservoir 36 includes, a bore 38 drilled through the pivot arm 20 leading to a circular groove 40 cut radially along an inner edge of the pivot arm opening 21 such that lubricant contacts the circumference of the hollow stem 10 when the hollow stem 10 is in place. The lubricant is dispensed as the hollow stem 10 is adjusted as previously set forth. A threaded cap 41 is secured over an opening of the reservoir 36 by grooves positioned along an outer top edge of the reservoir 36.

A means for engaging a U-shaped pivot base 50 to the pivot arm 20, the engaging means may comprise any suitable means, but in the preferred embodiment the engaging means comprises a truss axle 42 that extends through an opening 75 in a first leg 76 of the U-shaped pivot base 50 continuing through an opening 77 in the pivot arm 20 continuing through an opening 78 in a second leg 79 of the U-shaped pivot base 50, said truss axle 42 having a first end connected to a second knob handle 70 and a second end fitted to a truss axle gear 82 that locks into a gear assembly 84 incorporated in the opening 78 in the pivot base 20, the truss axle gear 82 and gear assembly 84 operate to secure the pivot arm 20 in place with respect to the pivot base 50, the pivot base 50 is secured to a bicycle at a point aft of the legs of the U-shaped pivot base 50 by a nut 51 and bolt 52 assembly.

Rotating the pivot arm 20 with respect to the pivot base 50 is accomplished by pushing upon the second knob handle 70 thereby disengaging the truss axle gear 82 from the gear assembly 84, releasing the second knob handle 70 causes a tension spring 86 enclosed in the opening 75 in the first leg 76 of the U-shaped pivot base 50 to force the truss axle 42 and truss axle gear 82 back into their permanent position once the desired rotation is achieved.

Figure 4:
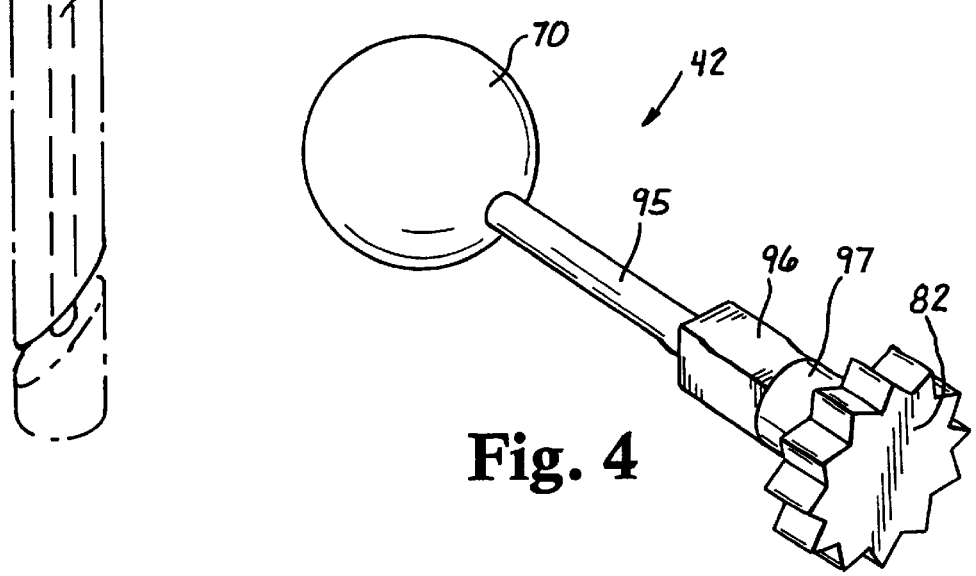
FIG. 4. a perspective view of the truss axle device.

FIG. 4 shows the truss axle 42 which is utilized to accomplish rotation of the pivot arm 20 with respect to the pivot base 50. The truss axle 42 is comprises three sections including a first rod 95 permanently joined to a first end of an elongated square section 96, the length of the side of the elongated square section 96 is greater than the diameter of the threaded rod 95, a second end of the elongated square section 96 is permanently joined to a second rod 97 with a diameter identical to that of the hypotenuse of the elongated square section 96, the first rod 95 is threaded to receive the second knob handle 70, the second rod 97 is threaded to be fitted with the truss axle gear 82.

Figure 5:
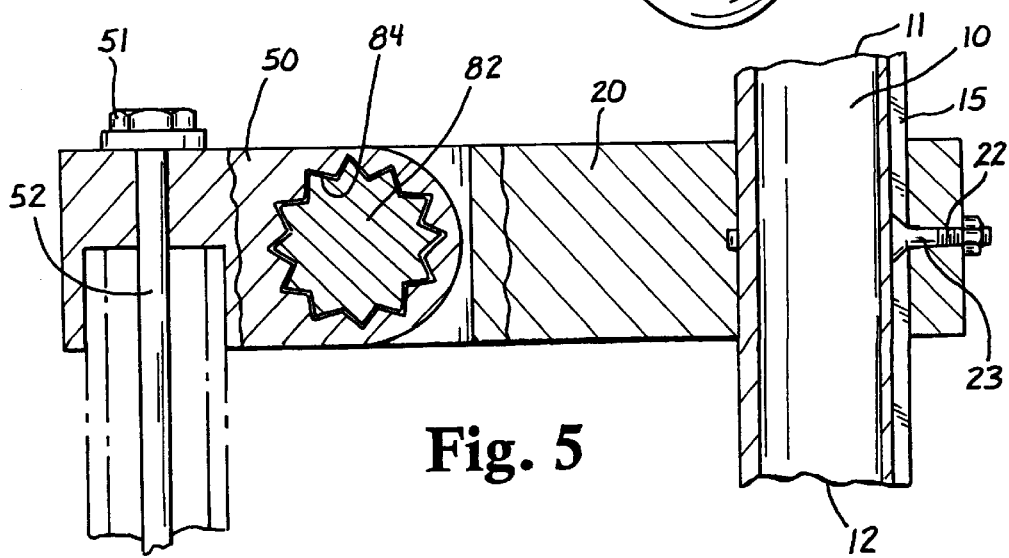
FIG. 5. is a fragmentary side view of the first embodiment of the present invention.

FIG. 5 clearly depicts the truss axle 42 fitted with the truss axle gear 82 locked into the gear assembly 84 while the pivot aim 20 and pivot base 50 are in the same plane.

Figure 6:
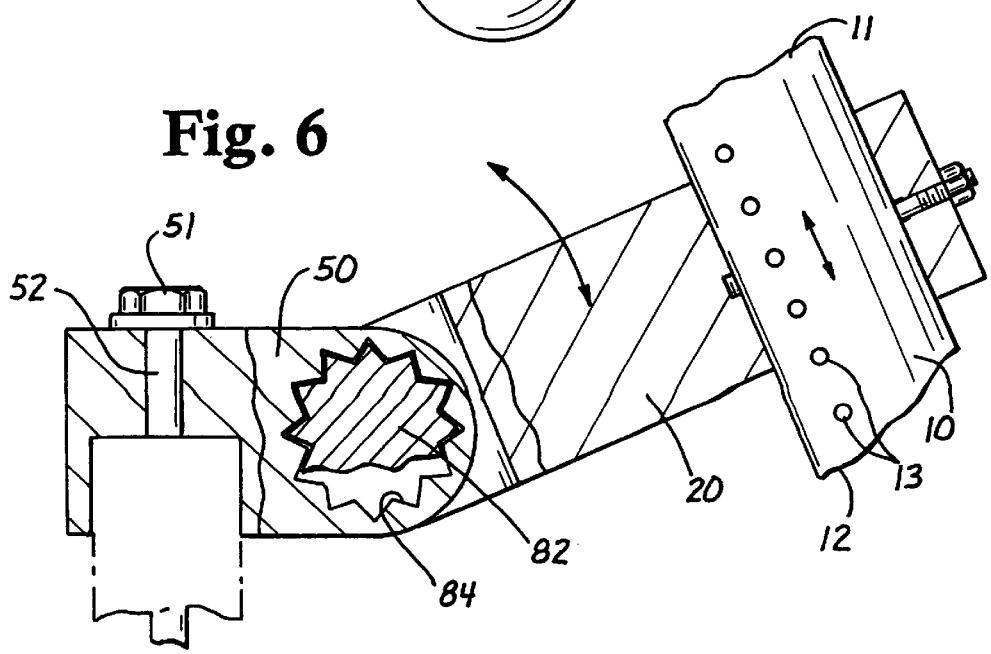
FIG. 6. is a fragmentary side view of the first embodiment illustrating the present invention in an adjusted state.

FIG. 6 depicts the pivot arm 20 at various angles of rotation with respect to the pivot base 50 and also shows the hollow stem 10 in various adjusted positions with respect to the pivot arm 20.

What is claimed is:

1. A telescopic and variable tilt bicycle gooseneck comprising:

a hollow stem having a first end and a second end, the first end suitable to receive a circular member of lessor diameter than the hollow stem, said circular member being a handlebar post;

a pivot arm including a circular opening through which the hollow stem is inserted;

a series of apertures spaced equidistance along a length of the hollow stem;

a position pin inserted through a bored hole in an outer edge of the pivot arm at a position radially adjacent to the pivot arm opening such that a first end of the position pin extends into the pivot arm opening and further extends into one of the apertures in the hollow stem thereby securing the hollow stem in position, a second end of the position pin attached to a lever arm positioned at an outside edge of the pivot arm, a first end of the lever arm being rotatably connected to a mounting pin extending from within the pivot arm, a second end of the lever arm being held in place by a coil spring, a first end of the coil spring attached to the second end of the lever arm, a second end of the coil spring attached to a bolt screwed into the pivot arm at a position radially adjacent the pivot arm opening;

a rod with a first end connected to the lever arm at a point near the second end of the lever arm, a second end of the rod connected to a first knob handle;

a means for pivoting the pivot arm with respect to a pivot base;

a nut and bolt assembly for mounting the pivot base to a bicycle frame.

2. The telescopic and variable tilt bicycle gooseneck as defined in claim 1 wherein the pivoting means comprises:

a truss axle extended through an opening in a first leg of a U-shaped pivot base continuing through an opening in the pivot arm continuing through an opening in a second leg of the U-shaped pivot base, said truss axle having a first end connected to a second knob handle, a second end of the truss axle fitted to a truss axle gear locked into a gear assembly incorporated into the second opening in the pivot base, the truss axle gear and gear assembly operate to secure the pivot arm in place with respect to the pivot base;

a tension spring enclosed in the opening in the first leg of the U-shaped pivot base, said truss axle extending through the tension spring in the opening in the first leg of the U-shaped pivot base.

3. The telescopic and variable tilt bicycle gooseneck as defined in claim 1 further comprising a caddy bolt screwed through an outer edge of the pivot arm at a position radially adjacent to the pivot arm opening such that the caddy bolt extends into the pivot base opening, a caddy attached to the caddy bolt, said caddy fits into a notch in the hollow stem such that the hollow stem is unable to rotate.

4. The telescopic and variable tilt bicycle gooseneck as defined in claim 1 further comprising a reservoir designed to hold lubricant is positioned on an upper plane of the pivot arm radially adjacent the pivot arm opening, the reservoir includes a bore drilled through the pivot arm leading to a circular groove cut radially along an inner edge of the pivot arm opening such that lubricant contacts the circumference of the hollow stem, a threaded cap is screwed over a channeled opening of the reservoir.

* * * * *